United States Patent
Eriksson et al.

[15] 3,678,791
[45] July 25, 1972

[54] APPARATUS FOR CUTTING ANNULAR ELASTIC BANDS

[72] Inventors: Anders Karl Oskar Eriksson, Bromma; Jan Folke Wallenius, Taby, both of Sweden

[73] Assignee: AB Svensk Industris Konstruktions-och berakningskontor Sikob, Solna, Sweden

[22] Filed: Aug. 31, 1970

[21] Appl. No.: 68,157

[30] Foreign Application Priority Data

Aug. 29, 1969 Sweden..............................12035/69

[52] U.S. Cl......................................83/95, 83/176, 83/607
[51] Int. Cl.............................................................B26d 7/06
[58] Field of Search..............83/95, 176, 202, 436, 607–609

[56] References Cited

UNITED STATES PATENTS 3,288,009  11/1966  Bradley....................................83/176
3,375,745  4/1968  Kuts.........................................83/176
3,417,644  12/1968  Bottom..................................83/607 X
3,558,254  1/1971  Cahill.....................................83/436 X Primary Examiner—Andrew R. Juhasz
Assistant Examiner—David R. Melton
Attorney—Waters, Roditi, Schwartz & Nissen

[57] ABSTRACT

An apparatus for cutting annular elastic bands from a rubber tube and comprising a knife-blade, a counter-knife, a mechanism for moving said knife-blade, said knife-blade during the cutting operation forming an angle with the counter-knife, and a means for flattening an end portion of the rubber tube and indexing said end portion beyond the counter-knife. The mechanism for moving the knife-blade displaces the knife-blade in the longitudinal direction of the knife edge so that an elastic deformation of the tube in the longitudinal direction of the counter-knife is substantially eliminated. A loop is formed at the edge of the flattened tube initially cut through by the knife-blade which loop is placed around a finger during the finishing of the cutting operation.

4 Claims, 3 Drawing Figures

PATENTED JUL 25 1972 3,678,791
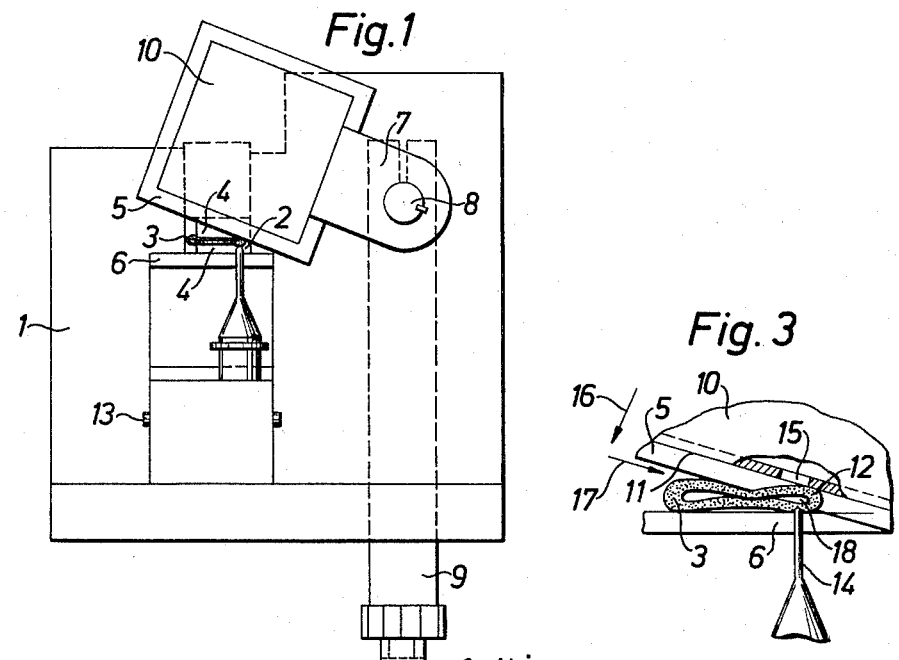
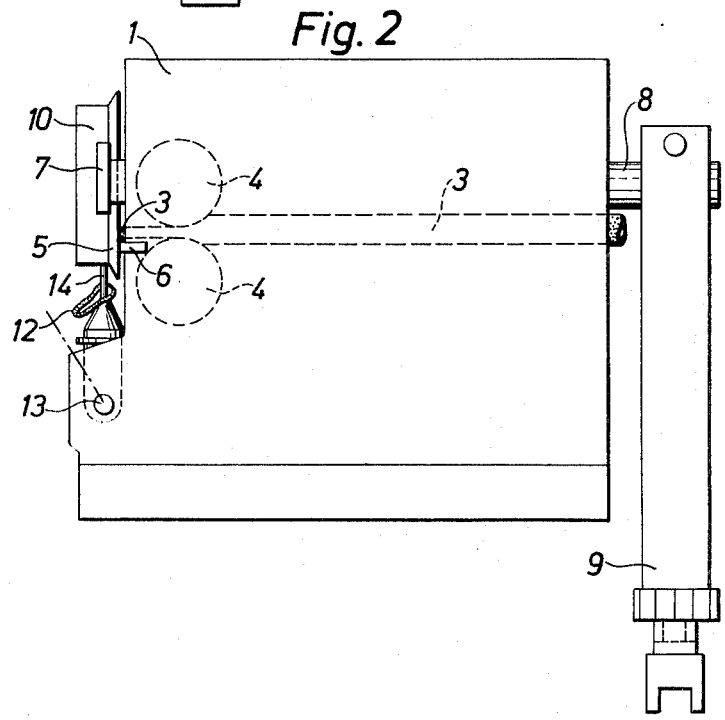

APPARATUS FOR CUTTING ANNULAR ELASTIC BANDS

This invention relates to an apparatus for cutting annular elastic bands from a rubber tube and comprising a knife-blade, a counter-knife, a mechanism for moving the knife-blade towards and past the counter-knife and a means for flattening the rubber tube and indexing the end of the rubber tube beyond the counter-knife in synchronism with the moving of the knife-blade.

Conventional devices of this kind can be used for cutting annular elastic bands from a tube made of rubber having a comparatively low elasticity, and in connection with the cutting the elastic bands are collected in a state of disorder in a container. In many machines for assembling or packeting objects an elastic band has to be applied around a portion of the object or packet. In this connection an intricate problem is involved in transferring the elastic bands one after the other from the container to the machine. Hence, it is to be desired that the apparatus for cutting the elastic bands should be able to deliver each elastic band after cutting one after the other by a suitable means. This, however, has turned out to be difficult to realize due to the irregularly varying movements and deformations of the elastic bands during the cutting operations. This is the case especially when the elastic bands are cut from a rubber tube made of very elastic material, e.g. a latex rubber tube. Attempts have been made using cutting apparatuses of conventional scissors-type. During the cutting operation, however, the elastic band has a tendency to be heaved over and partially turned inside out and at the same time stickiness arises due to the comparatively high cutting pressure, so that elastic bands after the cutting are fixed in odd and very often completely flattened shapes. Moreover, cutting by means of a rotating circular knife has been suggested which, however, does not give rise to any improvement, which to some extent is a consequence of the high friction between the knife-blade and the rubber material. Further, it has been suggested to feed the rubber tube on a rod extending in the interior of the tube and having a circular cross section area, which rod is provided with an annular notch for receiving the edge of a rotating circular knife circling around the rod. Nor this complicated apparatus has led to the desired result. Due to the elasticity of the rubber material and the friction between the knife edge and the rubber material the rubber tube has a tendency during the cutting operation to turn around the rod and at the same time move a short distance in the longitudinal direction, which may give rise to a helical cut in which case no severing is obtained.

The object of the invention is to attain an apparatus by which the elastic bands in an uncomplicated and reliable manner are cut and delivered from the apparatus one after the other. This has been obtained, according to the invention, in that the longitudinal direction of the edge of the knife-blade and that of the counter-knife during the cutting operation form an angle, in addition to which the knife-blade by said mechanism is imparted a longitudinal displacement which substantially eliminates the elastic deformation of the rubber tube in the longitudinal direction of the counter-knife caused by the angle existing between the knife edge and the counter-knife, and in that the free end of a finger or similar, rod-shaped member, after cutting of a portion of the elastic band, is arranged to be displaced relative to the loop formed by the cut portion into said loop for catching the elastic band when completely severed from said rubber tube. Due to the sloping of the knife-blade in combination with its longitudinal displacement a loop is formed very regularly at that portion of the elastic band at which the rubber tube is initially hit by the knife-blade, and the tendency of stickiness between the inner walls of the elastic bands pressed against each other, which tendency usually occurs in connection with known apparatuses, is completely avoided at least at said portion of the elastic band due to the fact that the cutting operation is initiated at an edge of the flattened rubber tube where the wall of the tube is folded an angle of 180° and, consequently, endeavours to return to its initial shape. Hence, the free end of the finger can be inserted with great accuracy into the loop, and if, for instance, the cross sectional area of said finger is arranged to increase in the direction from the free end of said finger and the elastic band is displaced along the finger it is possible to secure a delivery of an elastic band having the desired annular shape, even if the walls of the band with the exception of the initially formed loop should stick together during the cutting operation.

According to a preferred embodiment of the invention the knife-blade is, on the side surface directed away from the counter-knife, provided with an outwardly projecting guiding surface for folding the elastic band just being cut out from said side surface, which guiding surface is located at a distance from the edge of the knife-blade that is depending on the wall thickness and mechanical properties of the rubber tube, for instance is substantially equal to the thickness of the wall of the rubber tube compressed under the influence of the knife-blade. The folding obtained in this manner substantially facilitates the mounting of the finger for catching the elastic band, at which the guiding surface suitably can be provided with an aperture for receiving the free end of the finger so that an absolutely safe locking of the elastic band on the finger is obtained during the cutting operation.

The invention is described in the following with reference to the accompanying drawing which schematically illustrates, by way of example, an embodiment of an apparatus according to the invention and in which FIGS. 1 and 2 are an end view and a side view, respectively, of the apparatus illustrating two different working positions, and FIG. 3 is an end view of a detail in FIG. 1 shown in a further working position.

The apparatus shown in the drawing comprises a housing 1 in which a rubber tube 3 in a passage 2 is flattened and at the same time fed forward between two rolls 4 towards a cutting mechanism positioned at the one end of the passage and comprising a movable knife-blade 5 and a fixedly mounted counter-knife 6. The knife-blade 5 is secured to an arm 7 which is fixedly mounted on a shaft 8 journalled in the apparatus.

The knife-blade is pivoted to and from close to the counter-knife 6 by an operating arm 9 secured to the shaft 8 which additionally by a transmission, not shown, imparts to one of the rolls 4 a feeding motion in connection with the raising of the knife-blade above the rubber tube. A cap 10 is attached to the knife-blade on the side of the knife-blade 5 which is directed away from the counter-knife 6, which cap has a bottom side forming a guiding surface 11 projecting from the knife-blade and intended for folding out the elastic bands 12 during the cutting operation. Moreover, the apparatus comprises a finger 14 attached to a shaft 13. Shaft 13 is journalled in the housing 1 and driven in synchronism with the pivoting of the knife-blade 5, so that during a cutting operation the finger is positioned in the shown position but at the raising of the knife-blade above the counter-knife is positioned in an outwardly sloping position indicated on the drawing by dot-dashed lines. When the knife-blade is lowered the free end portion of the finger is inserted into an aperture 15 in the guiding surface 11.

As shown in FIG. 3 the cutting of an elastic band is initiated at one of the edges of the flattened rubber tube. The free end portion of the finger is positioned in the path of motion of the aperture in the guiding surface 11. The knife-blade is moved in the direction indicated by the arrow 16 and at the same time in the direction indicated by the arrow 17, which latter motion at a suitable positioning of the pivot axle in relation to the knife edge is adapted to substantially eliminate the tendency of the rubber tube to be resiliently deformed in the opposite direction of the arrow 17. Hence, a loop 18 is formed when the wall of the tube has been cut through at the place where the free end portion of the finger is positioned. As the cutting operation is continued the loop 18 increases at the same time as the loop is folded outwards by the guiding surface 11 around the free end of the finger, which then is inserted into the aperture 15. When the severing of the elastic band 12 is finished it is hanging on the finger 14, which then when the knife-blade is raised is pivoted to the sloping position in which the elastic band can be picked up by a suitable mechanism (not shown) which before that preferably is arranged to push the elastic band on the finger to a portion having a bigger cross sectional area in order to give the band an annular form.

The finger can, of course, be modified in different ways and can be movable in its longitudinal direction towards the guiding surface in which case the aperture 15 may be dispensed with. Further, the finger can be provided with a mechanism for delivering the elastic band 12 in a stretched condition.

What we claim is:

1. An apparatus for cutting the annular elastic bands from a rubber tube (3) and comprising a knife-blade (5), a counter-knife (6), a mechanism (7,8,9) for moving the knife-blade towards and past the counter-knife and a means (4) for flattening the rubber tube and indexing the end of the rubber tube beyond the counter-knife (6) in synchronism with the moving of the knife-blade (5), characterized in that the longitudinal direction of the edge of the knife-blade and that of the counter-knife (6) during the cutting operation form an angle, in addition to which the knife-blade (5) by said mechanism is imparted a longitudinal displacement which substantially eliminates the elastic deformation of the rubber tube in the longitudinal direction of the counter-knife (6) caused by the angle existing between the knife edge and the counter-knife, and in that the free end of a finger (14) or similar, rod-shaped member, after cutting of a portion of the elastic band (12), is arranged to be displaced relative to the loop (18) formed by the cut portion into said loop for catching the elastic band (12) when completely severed from said rubber tube.

2. An apparatus as claimed in claim 1, characterized in that the knife-blade (5) on the side surface directed away from the counter-knife (6) is provided with an outwardly projecting guiding surface (11) for folding the elastic band (12) just being cut out from said side surface, which guiding surface (11) is located at a distance from the edge of the knife-blade that is depending on the wall thickness and mechanical properties of the rubber tube (3), for instance is substantially equal to the thickness of the wall of the rubber tube (3) compressed under the influence of the knife-blade (5).

3. An apparatus as claimed in claim 2, characterized in that the guiding surface (11) has an aperture for receiving the free end portion of said finger (14).

4. An apparatus as claimed in claim 1, characterized in that the cross sectional area of said finger (14) increases in the direction from the free end of said finger.

* * * * *